United States Patent
Park et al.

(10) Patent No.: US 11,544,428 B2
(45) Date of Patent: *Jan. 3, 2023

(54) FLOW ANALYSIS APPARATUS AND METHOD THEREFOR

(71) Applicant: DOOSAN ENERBILITY CO., LTD., Changwon-si (KR)

(72) Inventors: Jeehun Park, Gwangmyeong-si (KR); Jaehyeon Park, Hwaseong-si (KR); Sangjin Lee, Yongin-si (KR); Hyunsik Kim, Gimpo-si (KR)

(73) Assignee: DOSAN ENERBILITY CO., LTD., Changwon (KR)

( * ) Notice: Subject to any disclaimer, the term of this patent is extended or adjusted under 35 U.S.C. 154(b) by 188 days.

This patent is subject to a terminal disclaimer.

(21) Appl. No.: 16/420,179

(22) Filed: May 23, 2019

(65) Prior Publication Data
US 2020/0065448 A1 Feb. 27, 2020

(30) Foreign Application Priority Data

Aug. 21, 2018 (KR) .................. 10-2018-0097538

(51) Int. Cl.
*G06F 30/23* (2020.01)
*G06F 30/28* (2020.01)
(Continued)

(52) U.S. Cl.
CPC .............. *G06F 30/23* (2020.01); *G06F 30/28* (2020.01); *G06F 17/13* (2013.01); *G06F 2111/10* (2020.01)

(58) Field of Classification Search
CPC ....... G06F 30/28; G06F 30/23; G06F 2111/10
See application file for complete search history.

(56) References Cited

U.S. PATENT DOCUMENTS

| 8,725,470 B1 | 5/2014 | Brown et al. |
| 2013/0066568 A1 | 3/2013 | Alonso |

(Continued)

FOREIGN PATENT DOCUMENTS

| KR | 10-2013-0131609 A | 12/2013 |
| KR | 10-2014-0087653 A | 7/2014 |

(Continued)

OTHER PUBLICATIONS

Glaz, Bryan, Li Liu, and Peretz P. Friedmann. "Reduced-order nonlinear unsteady aerodynamic modeling using a surrogate-based recurrence framework." AIAA journal 48.10 (2010): 2418-2429. (Year: 2010).*

(Continued)

*Primary Examiner* — Boris Gorney
*Assistant Examiner* — David A Hopkins
(74) *Attorney, Agent, or Firm* — Harvest IP Law LLP

(57) ABSTRACT

A flow analysis apparatus is provided. The flow analysis apparatus includes a model deriver configured to generate a flow analytic model for performing a flow analysis for a plurality of cells by using analytic data including a plurality of input signals used for performing multiple times iterations of numerical analysis by Computational Fluid Dynamics (CFD) and a plurality of output signals corresponding to each of the plurality of input signals, and a flow analyzer configured to perform the flow analysis for the plurality of cells that divide the space around a design target component by using the generated flow analytic model.

12 Claims, 8 Drawing Sheets

(51) Int. Cl.
  G06F 17/13     (2006.01)
  G06F 111/10    (2020.01)

(56) References Cited

U.S. PATENT DOCUMENTS

2017/0032068 A1* 2/2017 Iorio ............... G06N 20/00
2020/0363856 A1* 11/2020 Kulkarni ............ G06F 1/3203
2020/0387579 A1* 12/2020 Barr ................. G06F 30/367

FOREIGN PATENT DOCUMENTS

KR   10-2016-0007838 A      1/2016
KR      10-1612506 B1       4/2016
WO    WO-2005001722 A2 *    1/2005  .......... G06F 17/50

OTHER PUBLICATIONS

Zhu, Xiaocheng, et al. "Reduced-order modelling of wind turbine airfoil unsteady aerodynamic loading." Proceedings of the Institution of Mechanical Engineers, Part A: Journal of Power and Energy 229.1 (2015): 24-32. (Year: 2015).*
Annoni, Jennifer. (2016). Modeling for Wind Farm Control. Retrieved from the University of Minnesota Digital Conservancy (Year: 2016).*
Le Clainche, Soledad, and Esteban Ferrer. "A reduced order model to predict transient flows around straight bladed vertical axis wind turbines." Energies 11.3 (2018): 566. (Year: 2018).*
Lang, Yi-dong, et al. "Reduced order model based on principal component analysis for process simulation and optimization." Energy & Fuels 23.3 (2009): 1695-1706. (Year: 2009).*
Lang et al., "Reduced Order Modeling for CFD Units", 2011, PowerPoint Presentation, accessed via Carnegie Mellon University (Year: 2011).*
Lian, Yongsheng, and Meng-Sing Liou. "Multiobjective Optimization Using Coupled Response Surface Model and Evolutionary Algorithm." AIAA journal 43.6 (2005): 1316-1325. (Year: 2005).*
Su, Dan, Weiwei Zhang, and Zhengyin Ye. "A reduced order model for uncoupled and coupled cascade flutter analysis." Journal of Fluids and Structures 61 (2016): 410-430. (Year: 2016).*
Widmann, John, et al. Software Framework for Advanced Power Plant Simulations. Fluent Incorporated, 2010. (Year: 2010).*
Winter, Maximilian, and Christian Breitsamter. "Nonlinear identification via connected neural networks for unsteady aerodynamic analysis." Aerospace Science and Technology 77 (2018): 802-818. (Year: 2018).*
Bui-Thanh, Tan, Karen Willcox, and Omar Ghattas. "Parametric reduced-order models for probabilistic analysis of unsteady aerodynamic applications." AIAA journal 46.10 (2008): 2520-2529. (Year: 2008).*
Silva, Walter A., and Robert E. Bartels. "Development of reduced-order models for aeroelastic analysis and flutter prediction using the CFL3Dv6. 0 code." Journal of Fluids and Structures 19.6 (2004): 729-745. (Year: 2004).*
Silva, Walter A. "Simultaneous excitation of multiple-input/multiple-output CFD-based unsteady aerodynamic systems." Journal of Aircraft 45.4 (2008): 1267-1274. (Year: 2008).*
Bengio, Yoshua, and Paolo Frasconi. "An input output HMM architecture." Advances in neural information processing systems 7 (1994). (Year: 1994).*
Chen, Youming, and Zaikang Chen. "A neural-network-based experimental technique for determining z-transfer function coefficients of a building envelope." Building and Environment 35.3 (2000): 181-189. (Year: 2000).*
Hong, Yoon-Seok Timothy. "Dynamic nonlinear state-space model with a neural network via improved sequential learning algorithm for an online real-time hydrological modeling." Journal of hydrology 468 (2012): 11-21. (Year: 2012).*
Kim, Kihwan, Ali Beskok, and Suhada Jayasuriya. "Nonlinear system identification for the interaction of synthetic jets with a boundary layer." Proceedings of the 2005, American Control Conference, 2005 . . . . IEEE, 2005. (Year: 2005).*
Kou, Jiaqing, and Weiwei Zhang. "Multi-kernel neural networks for nonlinear unsteady aerodynamic reduced-order modeling." Aerospace Science and Technology 67 (2017): 309-326. (Year: 2017).*
Van Lint, J. W. C., S. P. Hoogendoorn, and Henk J. van Zuylen. "Accurate freeway travel time prediction with state-space neural networks under missing data." Transportation Research Part C: Emerging Technologies 13.5-6 (2005): 347-369. (Year: 2005).*
Liu, Haojie, et al. "Efficient reduced-order modeling of unsteady aerodynamics robust to flight parameter variations." Journal of Fluids and Structures 49 (2014): 728-741. (Year: 2014).*
Zamarreño, Jesús M., and Pastora Vega. "State space neural network. Properties and application." Neural networks 11.6 (1998): 1099-1112. (Year: 1998).*
Giorgi, Simone, Josh Davidson, and John V. Ringwood. "Identification of wave energy device models from numerical wave tank data—Part 2: Data-based model determination." IEEE Transactions on Sustainable Energy 7.3 (2016): 1020-1027. (Year: 2016).*
Sabir, Osama, and TMYS Tuan Ya. "Cell by cell artificial neural network model for predicting laminar, incompressible, viscous flow." Arpn J. Eng. Appl. Sci 11 (2016): 12084-12089. (Year: 2016).*
Amoura, Karima, Patrice Wira, and Said Djennoune. "A State-space Neural Network for Modeling Dynamical Nonlinear Systems." IJCCI (NCTA). 2011. (Year: 2011).*
Guo, Xiaoxiao, Wei Li, and Francesco Iorio. "Convolutional neural networks for steady flow approximation." Proceedings of the 22nd ACM SIGKDD international conference on knowledge discovery and data mining. 2016. (Year: 2016).*

* cited by examiner

FLOW ANALYSIS APPARATUS AND METHOD THEREFOR

CROSS-REFERENCE TO RELATED APPLICATION

This application claims priority to Korean Patent Application No. 10-2018-0097538, filed on Aug. 21, 2018, the disclosure of which is incorporated by reference herein in its entirety.

BACKGROUND

Field

Apparatuses and methods consistent with exemplary embodiments relate to a flow analysis technology, and more particularly, to a flow analysis apparatus and a method therefor.

Description of the Related Art

Flow analysis means to confirm an interaction between fluids such as liquids and gases around a target component to be analyzed and a surface defined by a boundary condition, and a change in flow thereby and relevant characteristics. Computational Fluid Dynamics (CFD) is to reproduce the flow of heat and fluid through computational operation, and has reproduced the analysis for the past heat and fluid motion by effective numerical analysis for a short time due to the development of a computer rather than a method based on the experiment, thereby resulting in time and cost savings. A governing equation of fluid behavior is a nonlinear partial differential equation describing the motion of fluid with viscosity, which is an equation including both the convection term and the diffusion term, and can analyze most flows that are present in the natural world such as weather and the fluid flow of current.

SUMMARY

Aspects of one or more exemplary embodiments provide a flow analysis apparatus and a method therefor for shortening the time of flow analysis.

According to an aspect of an exemplary embodiment, there is provided a flow analysis apparatus including: a model deriver configured to generate a flow analytic model for performing a flow analysis for a plurality of cells by simulating a numerical analysis by Computational Fluid Dynamics (CFD) with respect to the plurality of cells that divide a space around a component, and a flow analyzer configured to perform the flow analysis for the plurality of cells that divide the space around a design target component by using the generated flow analytic model.

The model deriver may include an analyzing data storage configured to store analytic data used for the numerical analysis, a signal generating model deriver configured to generate a signal generating model for predicting an input signal contributing to an output signal of the numerical analysis performed multiple times iterations through the analytic data, and an analytic model deriver configured to generate the analytic model for predicting the output signal of the numerical analysis performed multiple times iterations through the analytic data.

The signal generating model deriver predicts the input signal contributing to the output signal of the numerical analysis performed multiple times iterations through an Equation $$\hat{V}(k+T) = HQ \begin{bmatrix} V(k) \\ Y(k) \end{bmatrix} + D,$$

where the k and the K refer to the number of times of numerical analysis, the H refers to a degree of influence, the Q refers to a weight, the D refers to a cancellation constant, the $V(k)$ refers to an input signal of the $k^{th}$ numerical analysis, the $Y(k)$ refers to an output signal of the $k^{th}$ numerical analysis, and the $\hat{V}(k+T)$ refers to an input signal of the $(k+T)^{th}$ numerical analysis.

The signal generating model deriver generates a signal generating model by deriving a parameter through an optimization algorithm after constituting a relationship equation of the signal generating model where the parameter is not determined.

The analytic model deriver predicts the output signal of the numerical analysis performed multiple times iterations through an Equation $$\hat{Y}(k+T) = AP \begin{bmatrix} Y(k) \\ \hat{V}(k+T) \end{bmatrix} + C,$$

where the k and the T refer to parameters representing the number of times of numerical analysis, the A refers to a degree of influence, the P refers to a weight, the C refers to a cancellation constant, the $Y(k)$ refers to an output signal of the $k^{th}$ numerical analysis, the $\hat{V}(k+T)$ refers to an input signal of the $(k+T)^{th}$ numerical analysis, and the $\hat{Y}(k+T)$ refers to an output signal of the $(k+T)^{th}$ numerical analysis.

The analytic model deriver generates an analytic model by deriving a parameter through an optimization algorithm after constituting a relationship equation of the analytic model where the parameter is not determined.

The flow analyzer may include a numerical analyzer configured to derive the analytic data by performing the numerical analysis with respect to a design target component, a signal generator configured to generate the input signal contributing to the output signal of the numerical analysis performed multiple times iterations through the signal generating model derived from the signal generating model deriver and the analytic data derived from the numerical analyzer, and an analyzer configured to derive the output signal of the numerical analysis performed multiple times iterations through the analytic model derived from the analytic model deriver and the input signal predicted by the signal generator.

The numerical analyzer derives the analytic data by performing the numerical analysis by Computational Fluid Dynamics with respect to the plurality of cells that divide the space around a design target component.

The signal generator derives the input signal contributing to the output signal of the numerical analysis performed the number of predetermined times iterations by inputting the analytic data to the signal generating model.

The analyzer derives the output signal of the numerical analysis where the numerical analysis has been performed the number of predetermined times iterations by inputting the output signal of the analytic data and the contributing input signal to the analytic model.

According to an aspect of another exemplary embodiment, there is provided a flow analysis apparatus including: a model deriver configured to generate a flow analytic model for performing a flow analysis for a plurality of cells by using analytic data used for a numerical analysis by Computational Fluid Dynamics (CFD) with respect to the plurality of cells that divide a space around a component, and a flow analyzer configured to perform the flow analysis for the plurality of cells that divide the space around a design target component by using the generated flow analytic model.

The flow analytic model may simulate the numerical analysis performed multiple times iterations by the Computational Fluid Dynamics.

The flow analytic model may include one or more signal generating model for predicting an input signal contributing to a result of the numerical analysis performed multiple times iterations among the plurality of input signals through the analytic data, and an analytic model for predicting the result of the numerical analysis performed multiple times iterations through the analytic data.

The signal generating model may predict the input signal contributing to the output signal of the numerical analysis performed multiple times iterations through an Equation $$\hat{V}(k+T) = HQ\begin{bmatrix} V(k) \\ Y(k) \end{bmatrix} + D,$$

where the k and T refer to the number of times of numerical analysis, the H refers to a degree of influence, the Q refers to a weight, the D refers to a cancellation constant, the V(k) refers to an input signal of the $k^{th}$ numerical analysis, the Y(k) refers to an output signal of the $k^{th}$ numerical analysis, and the $\hat{V}(k+T)$ refers to an input signal of the $(k+T)^{th}$ numerical analysis.

The analytic model may predict the output signal of the numerical analysis performed multiple times iterations through an Equation $$\hat{Y}(k+T) = AP\begin{bmatrix} Y(k) \\ \hat{V}(k+T) \end{bmatrix} + C,$$

where the k and the T refer to the number of times of numerical analysis, the A refers to a degree of influence, the P refers to a weight, the C refers to a cancellation constant, the Y(k) refers to an output signal of the $k^{th}$ numerical analysis, the $\hat{V}(k+T)$ refers to an input signal of the $(k+T)^{th}$ numerical analysis, and the $\hat{Y}(k+T)$ refers to an output signal of the $(k+T)^{th}$ numerical analysis.

According to an aspect of another exemplary embodiment, there is provided a flow analysis method including: storing, by a model deriver, analytic data including a plurality of input signals used for a numerical analysis by Computational Fluid Dynamics (CFD) with respect to a plurality of cells that divide a space around a component and a plurality of output signals corresponding to each of the plurality of input signals, generating, by the model deriver, a flow analytic model for performing a flow analysis for the plurality of cells by using the analytic data, and performing, by a flow analyzer, the flow analysis for the plurality of cells that divide the space around a design target component by using the flow analytic model.

The generating the flow analytic model includes generating, by a signal generating model deriver, a signal generating model for predicting an input signal contributing to an output signal of the numerical analysis performed multiple times iterations among the plurality of input signals through the analytic data, and generating, by an analytic model deriver, an analytic model for predicting the output signal of the numerical analysis performed multiple times iterations among the plurality of input signals through the analytic data.

The generating the signal generating model includes predicting the input signal contributing to the output signal of the numerical analysis performed multiple times iterations through an Equation $$\hat{V}(k+T) = HQ\begin{bmatrix} V(k) \\ Y(k) \end{bmatrix} + D,$$

where the k and the T refer to the number of times of numerical analysis, the H refers to a degree of influence, the Q refers to a weight, the D refers to a cancellation constant, the V(k) refers to an input signal of the $k^{th}$ numerical analysis, the Y(k) refers to an output signal of the $k^{th}$ numerical analysis, and the $\hat{V}(k)$ refers to an input signal of the $(k+T)^{th}$ numerical analysis.

The generating the analytic model includes predicting the output signal of the numerical analysis performed multiple times iterations through an Equation $$\hat{Y}(k+T) = AP\begin{bmatrix} Y(k) \\ \hat{V}(k+T) \end{bmatrix} + C,$$

where the k and the T refer to the number of times of numerical analysis, the A refers to a degree of influence, the P refers to a weight, the C refers to a cancellation constant, the Y(k) refers to an output signal of the $k^{th}$ numerical analysis, the $\hat{V}(k+T)$ refers to an input signal of the $(k+T)^{th}$ numerical analysis, and the $\hat{Y}(k+T)$ refers to an output signal of the $(k+T)^{th}$ numerical analysis.

The generating the signal generating model includes constituting, by the signal generating model deriver, a relationship equation of the signal generating model where a parameter is not determined, and completing, by the signal generating model deriver, the signal generating model by deriving the parameter through an optimization algorithm.

The generating the analytic model includes constituting, by the analytic model deriver, a relationship equation of the analytic model where a parameter is not determined, and completing, by the analytic model deriver, the analytic model by deriving the parameter through an optimization algorithm.

The performing the flow analysis may include deriving, by a numerical analyzer, the analytic data by performing the numerical analysis with respect to a design target component, deriving, by a signal generator, the input signal contributing to the output signal of the numerical analysis performed multiple times iterations through the signal generating model derived from the signal generating model deriver and the analytic data derived from the numerical analyzer, and deriving, by an analyzer, the output signal of the numerical analysis performed multiple times iterations through the analytic model derived from the analytic model deriver, the input signal derived from the signal generator and the analytic data derived from the numerical analyzer.

As described above, according to one or more exemplary embodiments, it is possible to shorten the time for performing the flow analysis, thereby shortening the time required to develop the component.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
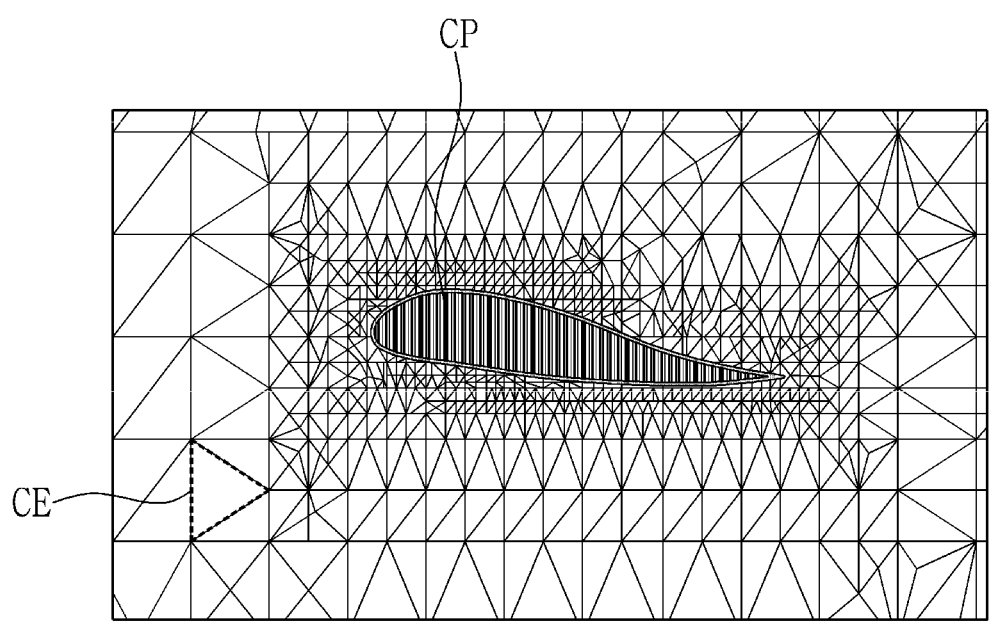
FIG. 1 is a diagram illustrating an example of dividing a design target component and the periphery thereof into a plurality of cells according to an exemplary embodiment.

Hereinafter, various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and technical scope disclosed herein. In order to clearly illustrate the disclosure in the drawings, some of the elements that are not essential to the complete understanding of the disclosure may be omitted, and like reference numerals refer to like elements throughout the specification.

The terminology used in the disclosure is for the purpose of describing specific embodiments only and is not intended to limit the scope of the disclosure. The singular expressions "a", "an", and "the" are intended to include the plural expressions as well unless the context clearly indicates otherwise. In the present disclosure, terms such as "comprises," "includes," or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Figure 2:
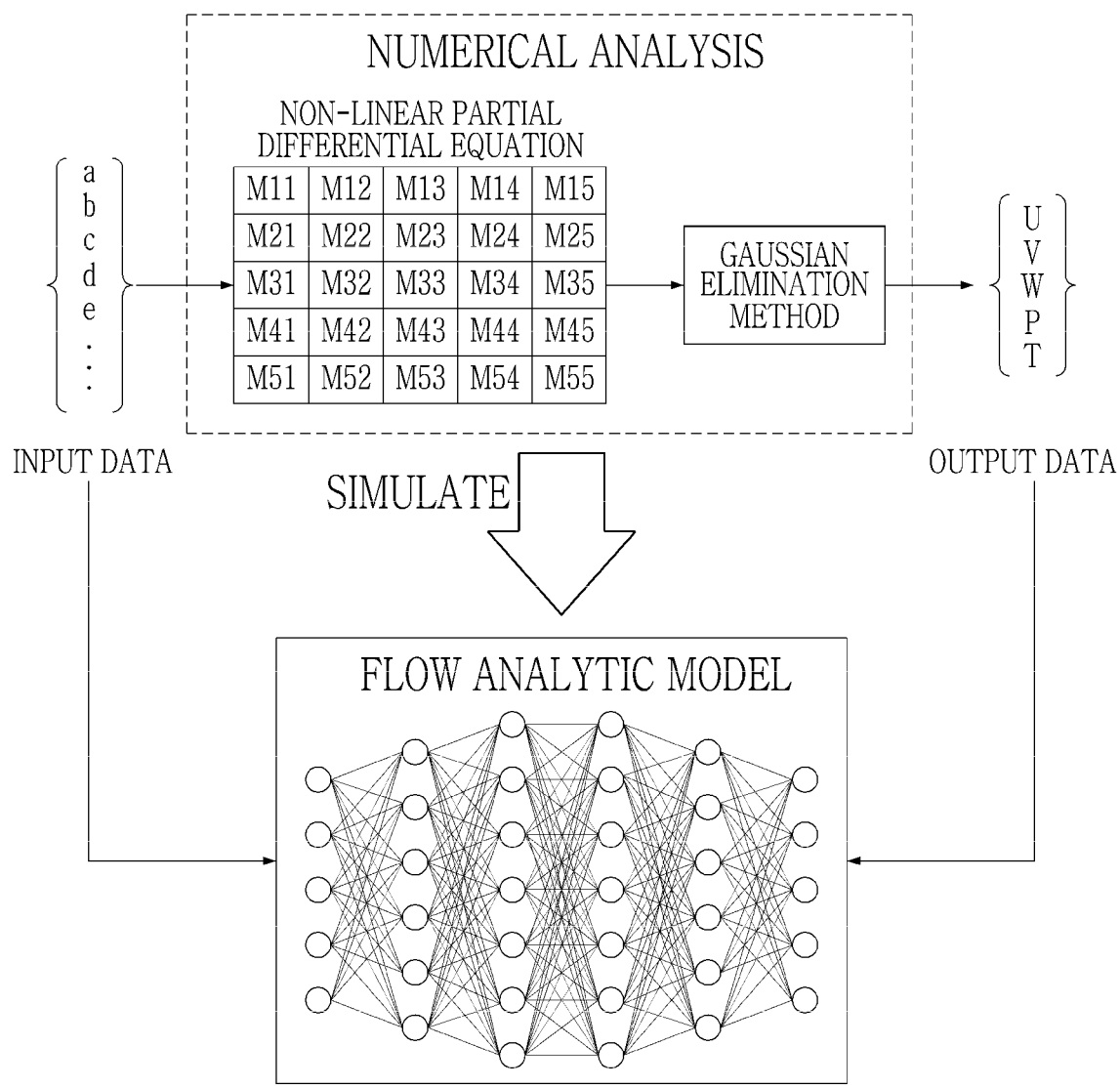
FIG. 2 is a diagram for explaining a flow analytic model according to an exemplary embodiment.
Figure 3:
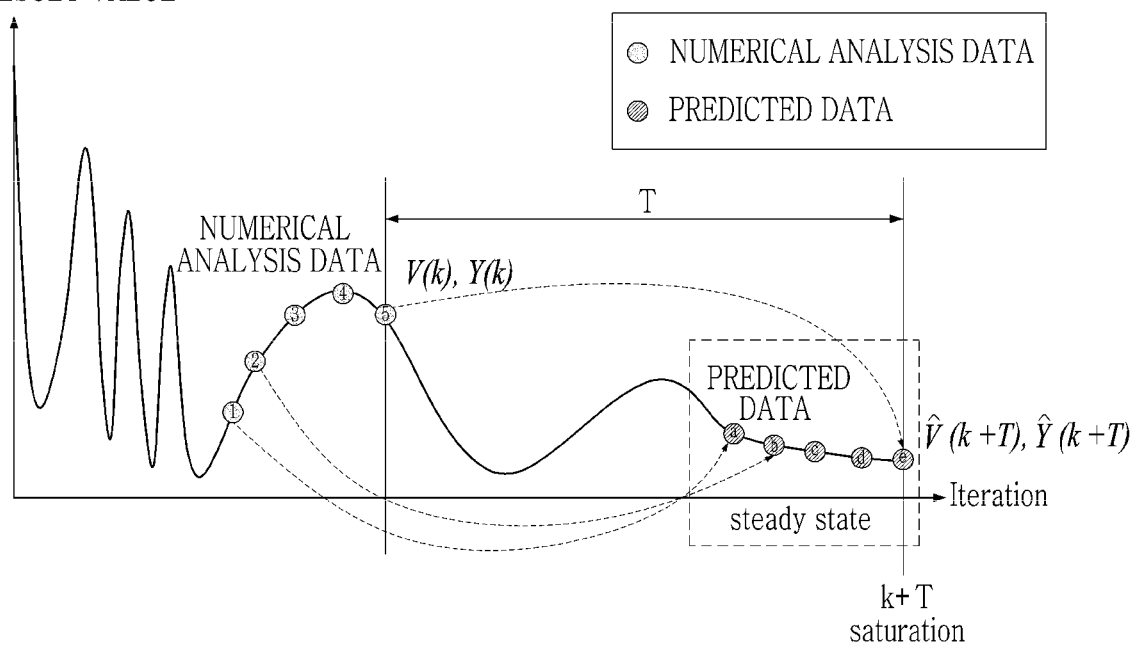
FIG. 3 is a graph for explaining a numerical analysis performed multiple times iterations for a flow analysis according to an exemplary embodiment.

First, a flow analytic model according to an exemplary embodiment will be described. FIG. 1 is a diagram illustrating an example of dividing a design target component and the periphery thereof into a plurality of cells according to an exemplary embodiment. FIG. 2 is a diagram for explaining a flow analytic model according to an exemplary embodiment. FIG. 3 is a graph for explaining a numerical analysis performed multiple times iterations for a flow analysis according to an exemplary embodiment.

Referring to FIG. 1, a flow analysis can be performed to design a component (CP), for example, a component such as a blade of a turbine. The flow analysis is to divide an area around the component CP into a plurality of cells CE, and to derive characteristics of fluid in each of the plurality of cells CE according to a boundary condition of the plurality of divided cells CE. An input signal for the flow analysis may be the boundary condition. For example, the input signal can be a laminar flow viscosity of fluid, a turbulent conduction, a time difference between the numerical analyses performed iteration, etc. in each cell CE. An output signal may be the characteristics of fluid. For example, the output signal can be a density, a momentum in the x and y directions, an internal energy, etc. in each cell CE.

Referring to FIG. 2, the numerical analysis by Computational Fluid Dynamics (CFD) can be performed for the flow analysis. Hereinafter, the expression of the numerical analysis in an exemplary embodiment means numerical analysis by Computational Fluid Dynamics. For the numerical analysis, the periphery of the component CP is divided into a plurality of cells CE. Then, a nonlinear partial differential equation for the plurality of cells CE is established. Then, an approximate solution of the partial differential equation can be obtained, for example, by a Gaussian elimination method.

Referring to a graph of FIG. 3, the numerical analysis is performed multiple times (k+T) iterations due to the characteristics of fluid. Conceptually, a result value of the numerical analysis of a predetermined number of times (k) at an initial stage is not steady due to characteristics of fluid, and becomes a steady state only after performing multiple times iterations. Therefore, the numerical analysis by Computational Fluid Dynamics performs iterations until the fluid around the component becomes a saturation state. That is, the flow analysis is for obtaining an output signal of the numerical analysis performed multiple times iterations. The numerical analysis for obtaining the approximate solution of this partial differential equation takes a long time because a parallel processing cannot be performed.

Therefore, according to one or more exemplary embodiments, the result of the numerical analysis performed multiple times iterations by Computational Fluid Dynamics may be obtained by using the analytic data including a plurality of input signals used for the numerical analysis and a plurality of output signals corresponding to the plurality of input signals. That is, a flow analytic model for predicting the output signal is generated, and the flow analysis is performed by using the generated flow analytic model. Therefore, it is possible to reduce the time for obtaining the approximate solution of the partial differential equation, thereby shortening the flow analysis time. Therefore, it is possible to shorten the time for designing the component.

The flow analytic model can use at least one of the models listed Table 1.

TABLE 1

| Parametric Model | Transfer Function | Equation Error | Auto-Regressive eXogeneous (ARX)<br>Nonlinear Auto-Regressive eXogeneous (NARX)<br>Finite Impulse Response (FIR)<br>Auto-Regressive Moving Average eXogenious (ARMAX): Pseudolinear Regression Model<br>Auto-Regressive (AR)<br>Auto-Regressive Moving Average (ARMA)<br>Auto-Regressive Auto-Regressive eXogeneous (ARARX): Generalized Least-Squares Model<br>Auto-Regressive Auto-Regressive Moving Average eXogeneous (ARARMAX): Extended Matrix Model |
| --- | --- | --- | --- |
| | | Output Error | Output Error (OE)<br>Box and Jenkins (BJ) |
| | State Space | | Linear Time Invariant (LTI), Linear Time Variant (LTV)<br>Linear Model, Nonlinear Model<br>Continuous Time, Discrete Time, Delay Time<br>Single Input Single Output (SISO),<br>Multi Input Multi Output (MIMO)<br>Stochastic Model, Deterministic Model<br>Robust, Open Loop, Closed Loop |
| Non Parametric Model | Non Parametric (Data Set Type)<br>Impulse Response<br>Step Response<br>Frequency Transfer Function<br>Tree<br>Neural Network (NN): FF, FB, Radial Basis Function, Convolutional, Spiking, Deep NN (Deep Belief Network), Recurrent NN | | |

In addition, the flow analytic model can be derived by using at least one of the optimization algorithms listed in Table 2.

TABLE 2

| Parametric Model | Prediction Error Method (PEM)<br>Maximum Likelihood Method (MLM)<br>Least-Squares Method (LSM)<br>-Batch Least-Squares Method<br>-Off-line Least-Squares Method<br>Extended Least-Squares Method (ELSM)<br>Generalized Least-Squares Method (GLSM)<br>Recursive Least-Squares Method (RLS)<br>Instrumental Variable Method (IVM)<br>Principle Component Analysis (PCA)<br>Dynamic Principle Component Analysis (DPCA)<br>Partial Least Squares (PLS)<br>SubSpace-based State Space Model Identification (4SID) Method<br>(+Singular Value Decomposition (SVD))<br>(+QR Decomposition)<br>-N4SID Method<br>-Multivariable Output Error State sPace (MOESP) Method<br>Canonical VariateAnalysis (CVA)<br>Singular Value Decomposition<br>Minimal Realization Method (MRM) |
| --- | --- |
| Non Parametric Model | Transient Response Method<br>Correlation Analysis<br>Frequency Response Method<br>Spectral Analysis Method<br>Empirical Transfer Function Estimate (ETFE) Method<br>Single/Multi-Layer Perceptron Learning, Back-Propagation, Gradient Descent<br>LayerwisePretraining: Auto-Encoder, BolzmannMachine |

Figure 4:
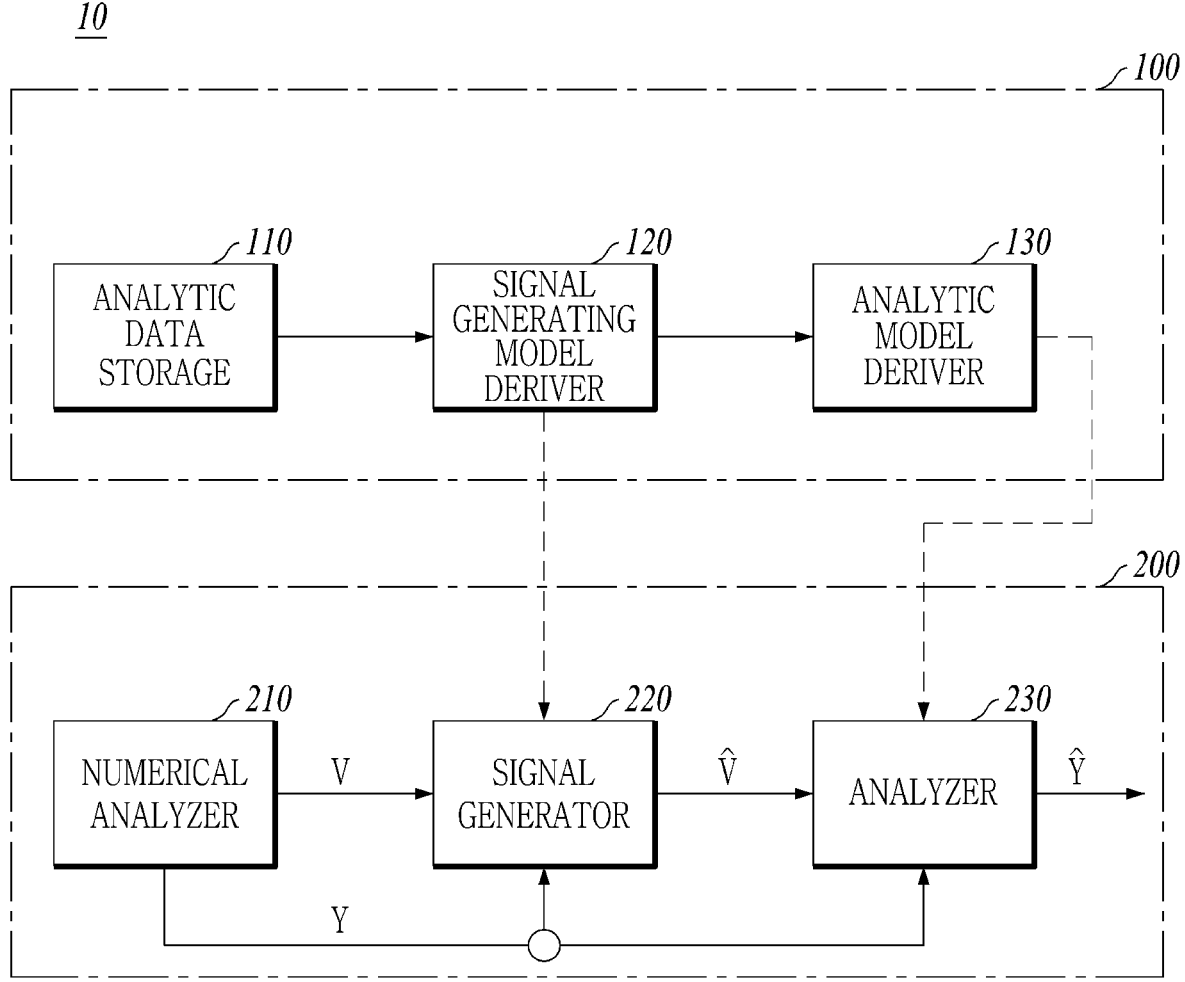
FIG. 4 is a block diagram for explaining a configuration of a flow analysis apparatus according to an exemplary embodiment.

Next, a flow analysis apparatus according to an exemplary embodiment will be described. FIG. 4 is a block diagram for explaining a configuration of a flow analysis apparatus according to an exemplary embodiment. Referring to FIG. 4, a flow analysis apparatus 10 may include a model deriver 100 and a flow analyzer 200.

The model deriver 100 generates a flow analytic model for performing a flow analysis for a plurality of cells that divide a space around a target. At this time, the model deriver 100 generates a flow analytic model by using the analytic data used for the numerical analysis by Computational Fluid Dynamics (CFD). Herein, the analytic data includes a plurality of input signals used for the numerical analysis performed multiple times iterations and a plurality of output signals corresponding to the plurality of input signals. The flow analytic model derives a result of the numerical analysis performed iterations by Computational Fluid Dynamics by simulating the numerical analysis by Computational Fluid Dynamics.

In particular, the flow analytic model can be composed of a plurality of models. The flow analytic model can include one or more signal generating models and one or more analytic models. The model deriver 100 includes an analytic data storage 110, a signal generating model deriver 120, and an analytic model deriver 130. The signal generating model and the analytic model can also use any one of the plurality of models of Table 1.

The analytic data storage 110 stores the analytic data. The analytic data can become analytic data used for the numerical analysis by Computational Fluid Dynamics for the plurality of cells CE that deride the area around the component CP. This analytic data includes a plurality of input signals and a plurality of output signals corresponding to the plurality of input signals. For example, the input signal can be the laminar flow viscosity of the fluid, the turbulent conduction, the time difference between the numerical analyses performed iterations, etc. in each cell CE. The output signal may be the characteristics of the fluid. For example, the output signal can be the density, the momentum in the x and y directions, the internal energy, etc. in each cell CE.

The signal generating model deriver 120 generates a signal generating model for deriving the input signal contributing to the output signal of the numerical analysis performed multiple times iterations among the plurality of input signals by using the analytic data stored in the analytic data storage 110. For example, if there are a plurality of input signals, the input signal for determining the output signal of the numerical analysis after performing the numerical analysis multiple times iterations can become a part of the plurality of input signals. As described above, the input signal contributing to the output signal means an input signal of the type and the iteration timing, which affect a change in the value of the output signal, among the input signals of a plurality of types and the iteration timings. That is, the signal generating model is for predicting the input signal contributing to the output signal after performing the numerical analysis multiple times iterations.

According to an exemplary embodiment, the signal generating model is as in Equation 1.

$$\hat{V}(k+T) = HQ\begin{bmatrix} V(k) \\ Y(k) \end{bmatrix} + D \quad \text{Equation 1}$$

In Equation 1, k and T refer to the number of times of numerical analysis. V(k) refers to the input signal of the kth numerical analysis, Y(k) refers to the output signal of the $k^{th}$ numerical analysis, and $\hat{V}$(k+T) refers to the input signal of the $(k+T)^{th}$ numerical analysis. Herein, T can have a different value or the same value according to the type of the output signal to be predicted (e.g., a density, a momentum in the x and y directions, an internal energy, etc.). H refers to a degree of influence on each cell. For example, only values corresponding to the corresponding cell affect the prediction of a value of any one cell, and values of other cells do not affect it. That is, it is a value for selecting a cell influenced by the corresponding input signal or output signal. Q refers to a weight. That is, the weight Q means a degree influenced by V(k) and Y(k) on the output $\hat{V}$(k+T). D refers to a cancellation constant for canceling a modeling error. That is, referring to the Equation 1 and the graph of FIG. 3, the signal generating model derives the analytic data used for the kth numerical analysis, that is, the input signal $\hat{V}$(k+T) contributing to the output signal according to the $(k+T)^{th}$ numerical analysis from the input signal V(k) and the output signal Y(k).

To derive the signal generating model, the signal generating model deriver 120 constitutes a relationship equation where, for example, the degree of influence H, the weight Q, and the cancellation constant D, which are the parameters of the Equation 1, are not determined. The signal generating model deriver 120 derives the parameters, that is, the degree of influence H, the weight Q, and the cancellation constant D through an optimization algorithm by inputting a plurality of analytic data, for example, V(k), Y(k), and V(k+T). The optimization algorithm can be, for example, a Least-Squares Method, a Backpropagation Algorithm, etc. As described above, when the parameters H, Q, and D of the relationship equation are determined, the signal generating model as in Equation 1 is completed.

For example, the signal generating model deriver 120 can constitute an Artificial Neural Network having a transfer function where the weight connections as in the Equation 1 are the parameters H, Q, and D. The parameters H, Q, and D, which are the weight connections, can be derived through the optimization algorithm (e.g., the Backpropagation algorithm) by using the analytic data as learning data, and the artificial neural network where the parameters H, Q and D have been determined can be derived as a signal generating model.

The analytic model deriver 130 derives the analytic model for calculating the output signal of the numerical analysis performed multiple times iterations by using the analytic data that include a plurality of input signals used for the numerical analysis based on the Computational Fluid Dynamics (CFD) and a plurality of output signals corresponding to the plurality of input signals. This analytic model simulates the numerical analysis performed multiple times iterations based on the Computational Fluid Dynamics (CFD).

For example, the analytic model is as in Equation 2.

$$\hat{Y}(k+T) = AP\begin{bmatrix} Y(k) \\ \hat{V}(k+T) \end{bmatrix} + C \quad \text{Equation 2}$$

In the Equation 2, k and T refer to the number of times of numerical analysis, Y(k) refers to the output signal of the $k^{th}$ numerical analysis, $\hat{V}$(k+T) refers to the input signal of the $(k+T)^{th}$ numerical analysis, and $\hat{Y}$(k+T) refers to the output signal of the $(k+T)^{th}$ numerical analysis. Herein, T can have a different value or the same value according to the type of the output signal to be predicted (e.g., a density, a momentum in the x and y directions, an internal energy, etc.). A refers to a degree of influence on each cell. For example, only values corresponding to the corresponding cell affect the prediction of a value of any one cell and values of other cells do not affect it. That is, it is a value for selecting a cell influenced by the c corresponding input signal or output signal. P refers to a weight. That is, the weight P means the degree influenced by Y(k) and $\hat{V}$(k+T) on the output $\hat{Y}$(k+T). C refers to a cancellation constant for canceling a modeling error.

Referring to the Equation 1, the Equation 2, and the graph of FIG. 3, the signal generating model of the Equation 1 derives the input signal $\hat{V}$(k+T) contributing to the output signal according to the $(k+T)^{th}$ numerical analysis from the input signal V(k) and the output signal Y(k) of the $k^{th}$ numerical analysis. The analytic model of the Equation 2 can derive the output signal Y(k) used for the $k^{th}$ numerical analysis, and the output signal $\hat{Y}$(k+T) according to the $(k+T)^{th}$ numerical analysis from the input signal $\hat{V}$(k+T) of the $(k+T)^{th}$ numerical analysis derived by the signal generating model of the Equation 1.

To derive the analytical model, the analytic model deriver 130 constitutes a relationship equation where, for example, the degree of influence A, the weight P, and the cancellation constant C, which are the parameters of the Equation 2, are not determined. The analytic model deriver 130 derives the parameters, that is, the degree of influence A, the weight P, and the cancellation constant C through an optimization algorithm by inputting a plurality of analytic data, for example, Y(k), V(k+T), and Y(k+T) to the relationship equation where the parameters are not determined. The optimization algorithm can be, for example, a Least-Squares Method, a Backpropagation Algorithm, etc. As described above, when the parameters A, P, and C are determined, the analytical model as in the Equation 2 is completed.

For example, the analytic model deriver 130 can constitute an artificial neural network having a transfer function where the weight connections as in the Equation 2 are the parameters A, P, and C. The parameters A, P, and C, which are the weight connections, can be derived through the optimization algorithm (e.g., the Backpropagation algorithm) by using the analytic data as learning data, and the artificial neural network where the parameters A, P, and C, which are the weight connections, have been determined can be derived by the analytic model.

The flow analyzer 200 performs the flow analysis for the plurality of cells CE that divide the space around the design target component CP by using the flow analytic model including the signal generating model and the analytical model derived from the model deriver 100. The flow analyzer 200 may include a numerical analyzer 210, a signal generator 220, and an analyzer 230.

The numerical analyzer 210 performs the numerical analysis by Computational Fluid Dynamics (CFD). Therefore, an input signal for the numerical analysis and an output signal corresponding to the input signal are derived. For example, the input signal according to the numerical analysis can be V(k), and the output signal can be Y(k).

The signal generator 220 predicts the input signal contributing to the output signal of the numerical analysis performed multiple times (k+T) iterations by reflecting the input signal and the output signal derived from the numerical analyzer 210 to the signal generating model generated by the signal generating model deriver 120. For example, the signal generator 220 can derive the input signal $\hat{V}(k+T)$ contributing to the output signal of the numerical analysis performed multiple times (k+T) iterations by inputting the input signal V(k) and the output signal Y(k) to the signal generating model as in the Equation 1.

The analyzer 230 predicts the output signal of the numerical analysis performed multiple times (k+T) iterations by reflecting the input signal predicted by the signal generator 220 and the output signal derived from the numerical analyzer 210 to the analytical model derived from the analytic model deriver 130. For example, the analyzer 230 can derive the output signal of the numerical analysis performed multiple times (k+T) iterations by inputting the predicted input signal $\hat{V}(k+T)$ and output signal Y(k) to the analytical model as in the Equation 2.

Referring to FIG. 3, when the flow analysis is performed through the numerical analysis by Computational Fluid Dynamics (CFD), the desired result of the flow analysis, that is, the output signal $\hat{Y}(k+T)$ can be obtained only after the numerical analysis is performed multiple times (k+T) iterations. However, because the desired result $\hat{Y}(k+T)$ of the flow analysis can be obtained through the flow analytic model from the $k^{th}$ numerical analysis by the numerical analyzer 210, it is not necessary to perform the numerical analysis the number of times T iterations, thereby shortening the time required for the flow analysis by the time for performing the numerical analysis the number of times T iterations. Therefore, it is possible to shorten the time required for developing the component.

Figure 5:
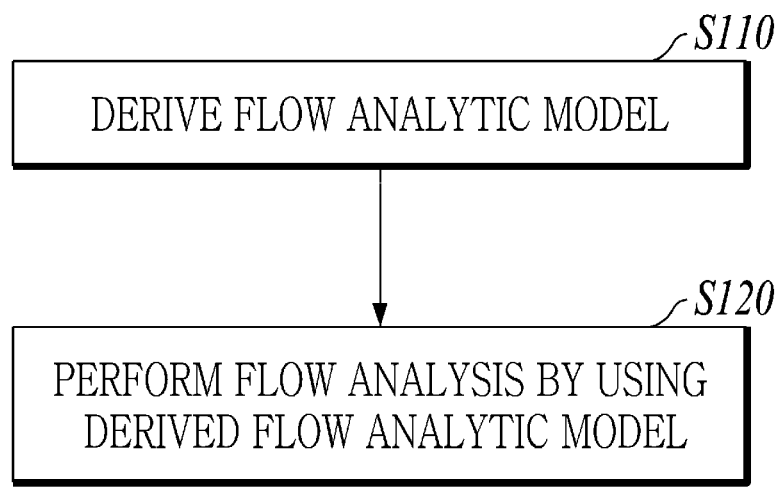
FIG. 5 is a flowchart for explaining a flow analysis method according to an exemplary embodiment.

Next, a flow analysis method according to an exemplary embodiment will be described. FIG. 5 is a flowchart for explaining a flow analysis method according to an embodiment.

Referring to FIG. 5, the model deriver 100 generates the flow analytic model for performing the flow analysis for the plurality of cells CE that divide the space around the flow analysis target component CP by using the analytic data (operation S110). Herein, the analytic data includes a plurality of input signals used for the numerical analysis performed multiple times iterations by Computational Fluid Dynamics (CFD) and a plurality of output signals corresponding to the plurality of input signals. In particular, the flow analytic model simulates the numerical analysis performed multiple times iterations by Computational Fluid Dynamics (CFD). In addition, the flow analytic model can also include one or more signal generating models and one or more analytic models.

The flow analyzer 200 performs the flow analysis for the plurality of cells CE of the space around the flow analysis target component CP through the flow analytic model including one or more signal generating model and one or more analytic model derived from the model deriver 100 (operation S120).

The above-described operations S110 and S120 will be described in more detail.

Figure 6:
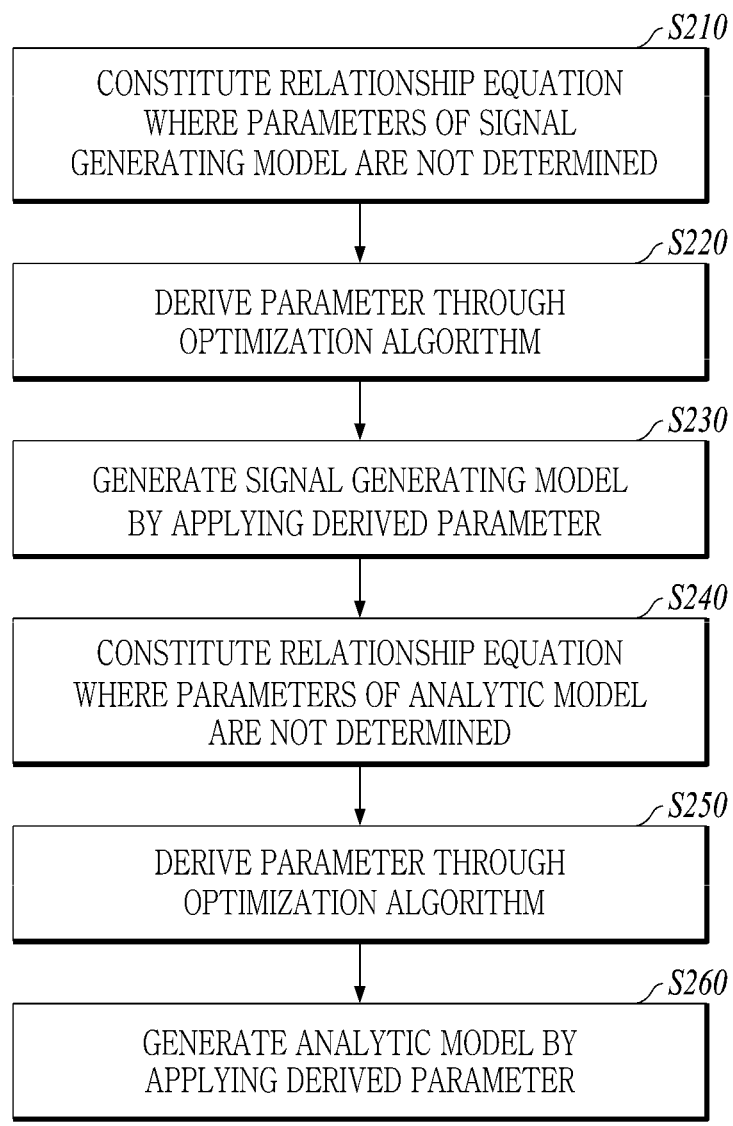
FIG. 6 is a flowchart for explaining a method for generating the flow analytic model according to an exemplary embodiment.

FIG. 6 is a flowchart for explaining a method for generating a flow analytic model (in operation S110) according to an exemplary embodiment.

Referring to FIG. 6, the signal generating model deriver 120 constitutes a relationship equation where parameters, that is, a degree of influence H, a weight Q, and a cancellation constant D are not determined (operation S210). For example, the relationship equation where the parameters are not determined is as in the Equation 1 where the parameters H, Q, and D are unknown.

The signal generating model deriver 120 puts the analytic data into the relationship equation, and derives the parameters H, Q, and D of the relationship equation by using an optimization algorithm (operation S220). Herein, the optimization algorithm can be, for example, a Least-Squares Method, a Backpropagation algorithm, etc. For example, the analytic data can be V(k), Y(k), and V(k+T) used for the existing numerical analysis.

The signal generating model deriver 120 generates the signal generating model by applying the parameters H, Q, and D to the relationship equation (operation S230). For example, the signal generating model as in the Equation 1 is completed by applying the values of the parameters H, Q, and D to the relationship equation. This signal generating model predicts the input signal contributing to the output signal of the numerical analysis performed multiple times iterations.

The analytic model deriver 130 constitutes the relationship equation of the analytic model where a degree of influence A, a weight P, and a cancellation constant C that are parameters are not determined (operation S240). For example, the relationship equation where the parameters are not determined is as in the Equation 2 where the parameters A, P, and C are unknown.

The analytic model deriver 130 puts the analytic data into the relationship equation, and derives the parameters A, P, and C of the relationship equation through the optimization algorithm. For example, the analytic data can be Y(k), V(k+T), and Y(k+T) used for the existing numerical analysis (operation S250).

The analytic model deriver 130 generates the analytic model by applying the parameters A, P, and C to the relationship equation (operation S260). For example, the analytical model as in the Equation 2 is completed by applying the values of the parameters A, P, and C to the relationship equation. This analytical model predicts the output signal of the numerical analysis performed multiple times iterations.

As described above, the signal generating model is generated in the operation S230, and the analytic model is generated in the operation S260, thereby completing the flow analytic model including the signal generating model and the analytic model.

Figure 7:
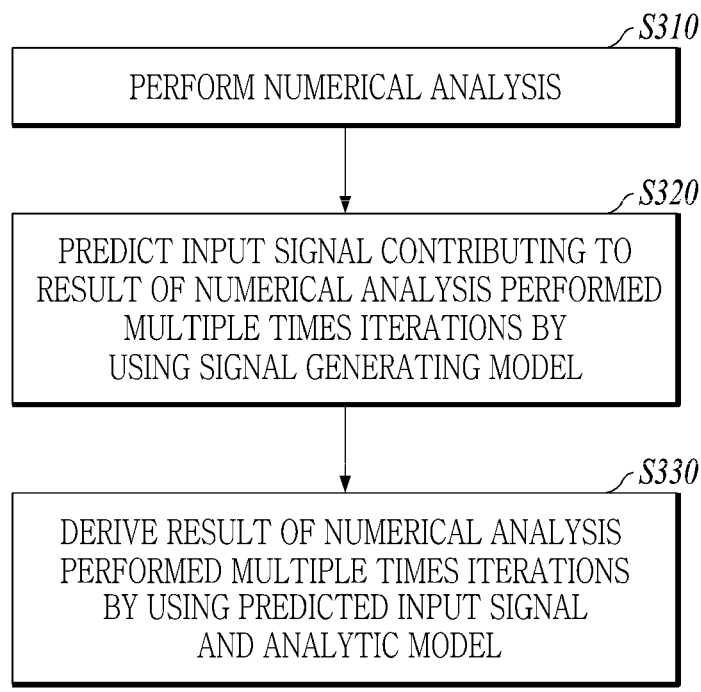
FIG. 7 is a flowchart for explaining a method for performing the flow analysis according to an exemplary embodiment.

A method for performing the flow analysis by using the above-described flow analytic model will be described. FIG. 7 is a flowchart for explaining a method for performing a flow analysis (in operation S120) according to an exemplary embodiment.

Referring to FIGS. 2, 3, and 7, the numerical analyzer 210 derives an input signal and an output signal by the numerical analysis by performing the numerical analysis by Computational Fluid Dynamics (CFD) (operation S310). For example, according to the Equations 1 and 2, the input signal can be V(k) and the output signal can be Y(k).

The signal generator 220 predicts the input signal contributing to the output signal of the numerical analysis performed multiple times (k+T) iterations by reflecting the input signal and the output signal derived from the numerical analyzer 210 to the signal generating model (operation S320). For example, the signal generator 220 can derive the input signal $\hat{V}(k+T)$ contributing to the output signal of the numerical analysis performed multiple times (k+T) iterations by inputting the input signal V(k) and the output signal Y(k) to the signal generating model as in the Equation 1.

The analyzer 230 predicts the output signal of the numerical analysis performed multiple times (k+T) iterations by reflecting the input signal predicted by the signal generator 220 and the output signal derived from the numerical analyzer 210 to the analytic model derived from the analytic model deriver 130 (operation S330). For example, the analyzer 230 can derive the output signal $\hat{Y}(k+T)$ of the numerical analysis performed multiple times (k+T) iterations by inputting the predicted input signal $\hat{V}(k+T)$ and output signal Y(k) to the analytical model as in the Equation 2.

Figure 8:
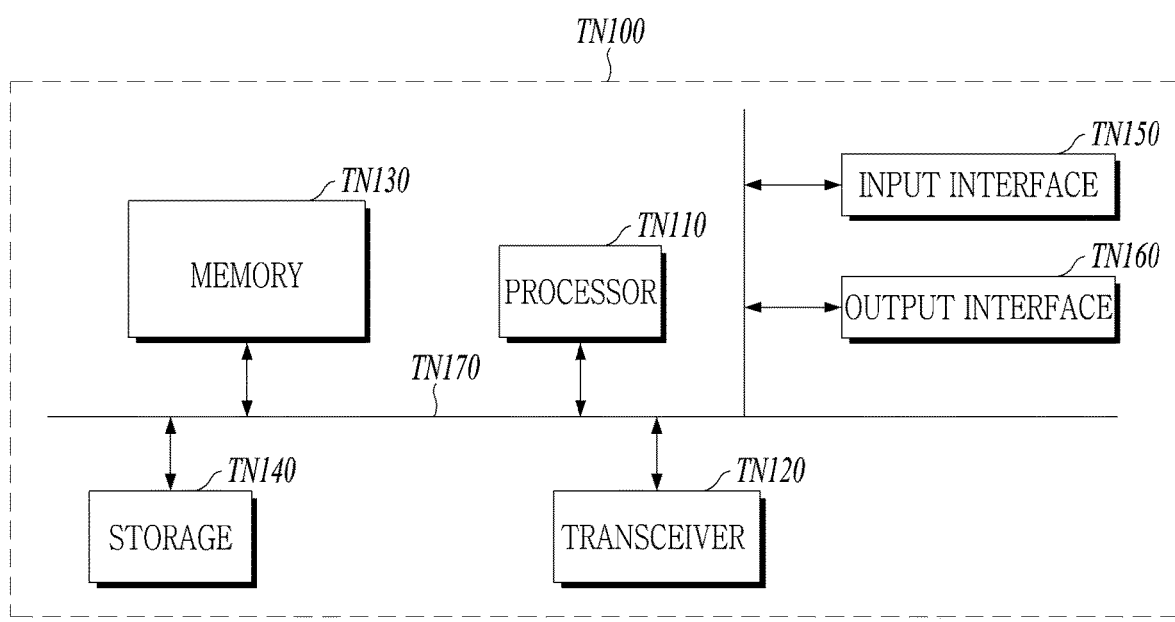
FIG. 8 is a diagram illustrating a computing apparatus according to an exemplary embodiment.

FIG. 8 is a diagram illustrating a computing apparatus according to an exemplary embodiment. A computing apparatus TN100 can be the apparatus described in the present specification (e.g., the flow analysis apparatus, etc.).

Referring to FIG. 8, the computing apparatus TN100 can include at least one processor TN110, a transceiver TN120, and a memory TN130. In addition, the computing apparatus TN100 can further include a storage device TN140, an input interface TN150, an output interface TN160, etc. The components included in the computing apparatus TN100 can be connected by a bus TN170 and communicate with each other.

The processor TN110 can execute a program command stored in at least one of the memory TN130 and the storage device TN140. The processor TN110 can include a central processing unit (CPU), a graphics processing unit (GPU), or a dedicated processor on which the methods according to an exemplary embodiment are performed. The processor TN110 can be configured to implement the procedures, functions, methods, etc. described in connection with an exemplary embodiment. The processor TN110 can control each component of the computing apparatus TN100.

Each of the memory TN130 and the storage device TN140 can store various information related to an operation of the processor TN110. Each of the memory TN130 and the storage device TN140 can be composed of at least one of a volatile storage medium and a nonvolatile storage medium. For example, the memory TN130 can be composed of at least one of a read only memory (ROM) and a random access memory (RAM).

The transceiver TN120 can transmit and/or receive a wired signal or a wireless signal. The transceiver TN120 can be connected to a network to perform communication.

Meanwhile, the flow analysis method according to an exemplary embodiment can be implemented in the form of a readable program through various computer means and recorded in a computer-readable recording medium. Herein, the recording medium can include program commands, data files, data structures, etc. alone or in combination thereof. The program commands to be recorded on the recording medium can be those specially designed and constructed for the present disclosure or can also be those known and available to those skilled in the art of computer software. For example, the recording medium can be magnetic media such as hard disks, floppy disks, and magnetic tapes, optical media such as CD-ROMs and DVDs, magneto-optical media such as floptical disks, and hardware devices specially configured to store and execute the program commands such as ROMs, RAMs, and flash memory. Examples of the program commands can include not only machine language wires such as those produced by a compiler but also high-level language wires that can be executed by a computer by using an interpreter, etc. This hardware device can be configured to operate as one or more software modules in order to perform the operation of the present disclosure, and vice versa.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A flow analysis apparatus comprising a processor, memory including computer program commands, and a storage, wherein the program commands are executed by the processor, the program commands comprise:

generating, by the processor, a flow analytic model for estimating a result of a Computational Fluid Dynamics (CFD) numerical analysis with respect to a plurality of cells that divide a space around a component, wherein the generating of the flow analytic model comprises:

generating, by the processor, training data comprising plurality of input and output signals in a steady and an unsteady state of fluid by running the CFD numerical analysis for a predetermined number of iterations, wherein the input signals comprise a laminar flow viscosity of fluid, a turbulent conduction, and a time difference between the numerical analyses performed iterations in each cell, and storing, in the storage, the training data;

generating, by the processor, a first artificial neural network model using the training data to predict an estimated steady state input signal, wherein parameters of the first artificial neural network model are determined using a Backpropagation algorithm by inputting the input signals in the unsteady state, the output signals in the unsteady state, and the input signals in the steady state to the first artificial neural network model, and the parameters of the first artificial neural network model comprise a first parameter determining, among the plurality of cells, cells affecting the estimated steady state input signal and cells not affecting the estimated steady state input signal; and generating, by the processor, a second artificial neural network model using the training data to predict an estimated steady state output signal, wherein parameters of the second artificial neural network model are determined using the Backpropagation algorithm by inputting the output signals in the unsteady state, the input signals in the steady state, and the output signals in the steady state to the second artificial neural network model, and the parameters of the second artificial neural network model comprise a second parameter determining, among the plurality of cells, cells affecting the estimated steady state output signal and cells not affecting the estimated steady state output signal, and performing, by the processor, a flow analysis for a component of interest by inputting input and output signals of the component of interest in the unsteady state to the generated flow analytic model to produce the estimated steady state output signal for the component of interest without repeated executions of the CFD numerical analysis.

2. The flow analysis apparatus of claim 1,
wherein the first artificial neural network model is generated through an Equation $$\hat{V}(k+T) = HQ\begin{bmatrix} V(k) \\ Y(k) \end{bmatrix} + D$$

wherein the k refers to the number of iterations of numerical analysis in the unsteady state of fluid and the k+T refer to the number of iterations of numerical analysis in the steady state of fluid, wherein the $V(k)$ refers to an input signal of the $k^{th}$ numerical analysis, wherein the $Y(k)$ refers to an output signal of the $k^{th}$ numerical analysis, and wherein the $\hat{V}(k+T)$ refers to an estimated steady state input signal of the $(k+T)^{th}$ numerical analysis, the estimated steady state input signal $\hat{V}(k+T)$ contributing to the output signal according to the $(k+T)^{th}$ numerical analysis being derived from the training data including the input signal $V(k)$ and the output signal $Y(k)$ used for the $k^{th}$ numerical analysis, wherein the H refers to a degree of influence of each cell with respect to the $\hat{V}(k+T)$, wherein the Q refers to a weight of the $$\begin{bmatrix} V(k) \\ Y(k) \end{bmatrix} \text{on the } \hat{V}(k+T),$$

wherein the D refers to a cancellation constant.

3. The flow analysis apparatus of claim 2,
wherein the first artificial neural network model is generated by deriving the H, Q, and D parameters through the Backpropagation algorithm where the parameters are not initially determined.

4. The flow analysis apparatus of claim 1,
wherein the second artificial neural network model is generated through an Equation, $$\hat{Y}(k+T) = AP\begin{bmatrix} Y(k) \\ \hat{V}(k+T) \end{bmatrix} + C$$

wherein the k refers to the number of iterations of numerical analysis in the unsteady state of fluid and the k+T refer to the number of iterations of numerical analysis in the steady state of fluid, wherein the $Y(k)$ refers to an output signal of the $k^{th}$ numerical analysis, wherein the $\hat{V}(k+T)$ refers to an estimated steady state input signal of the $(k+T)^{th}$ numerical analysis, and wherein the $\hat{Y}(k+T)$ refers to an estimated steady state output signal of the $(k+T)^{th}$ numerical analysis, the estimated output signal $\hat{Y}(k+T)$ according to the $(k+T)^{th}$ numerical analysis being derived from the output signal $Y(k)$ used for the $k^{th}$ numerical analysis and the estimated input signal $\hat{V}(k+T)$ of the $(k+T)^{th}$ numerical analysis derived by the first artificial neural network model, wherein the A refers to a degree of influence of each cell with respect to the $\hat{V}(k+T)$, wherein the P refers to a weight of the $$\begin{bmatrix} V(k) \\ Y(k) \end{bmatrix} \text{on the } \hat{V}(k+T),$$

wherein the C refers to a cancellation constant.

5. The flow analysis apparatus of claim 4, wherein the second artificial neural network model is generated by deriving the A, P and C parameters through the Backpropagation algorithm where the parameters are not initially determined.

6. The flow analysis apparatus of claim 1,
wherein the performing of the flow analysis comprises:
generating, by the processor, input and output signals of the component of interest in the unsteady state by performing the CFD numerical analysis;
generating an estimated steady state input signal of the component of interest through the first neural network model by inputting the input and output signals of the component of interest; and
generating an estimated steady state output signal of the component of interest through the second neural network model by inputting the estimated steady state input signal of the component of interest and the output signals of the component of interest.

7. The flow analysis apparatus of claim 6,
wherein the input and output signals of the component of interest are derived by performing the CFD numerical analysis with respect to the plurality of cells that divide the space around the component of interest.

8. The flow analysis apparatus of claim 7,
wherein the first artificial neural network model generates the estimated steady state input signal of the component of interest by inputting the input and output signals of the component of interest to the first artificial neural network model.

9. The flow analysis apparatus of claim 8,
wherein the second artificial neural network model generates the estimated steady state output signal of the component of interest by inputting the estimated steady state input signal of the component of interest and the output signals of the component of interest to the second artificial neural network.

10. A flow analysis method, comprising:
storing, by a model deriver, plurality of training data received from plurality of Computational Fluid Dynamics (CFD) numerical analysis with respect to a plurality of cells that divide a space around a component, wherein the training data comprises input and output signals in a steady state and an unsteady state of fluid and the input signals comprise a laminar flow viscosity of fluid, a turbulent conduction, and a time difference between the numerical analyses performed iterations in each cell,
generating, by the model deriver, a flow analytic model for estimating a result of the CFD numerical analysis, wherein the generating of the flow analytic model comprises:

generating, by a signal generating model deriver, a first artificial neural network model using the training data to predict an estimated steady state input signal, wherein parameters of the first artificial neural network model are determined using a Backpropagation algorithm by inputting the input signals in the unsteady state, the output signals in the unsteady state, and the input signals in the steady state to the first artificial neural network model, and the parameters of the first artificial neural network model comprise a first parameter determining, among the plurality of cells, cells affecting the estimated steady state input signal and cells not affecting the estimated steady state input signal; and generating, by an analytic model deriver, a second artificial neural network model using the training data to predict an estimated steady state output signal, wherein parameters of the second artificial neural network model are determined using the Backpropagation algorithm by passing inputting the output signals in the unsteady state, the input signals in the steady state and the output signals in the steady state to the second artificial neural network model, and the parameters of the second artificial neural network model comprise a second parameter determining, among the plurality of cells, cells affecting the estimated steady state output signal and cells not affecting the estimated steady state output signal, and performing, by a flow analyzer, a flow analysis for a component of interest by inputting input and output signals of the component of interest in the unsteady state to the flow analytic model to produce the estimated steady state output signal for the component of interest without repeated executions of the CFD numerical analysis.

11. The flow analysis method of claim 10,
wherein the generating the signal generating model comprises generating the signal generating model through an Equation $$\hat{V}(k+T) = HQ\begin{bmatrix} V(k) \\ Y(k) \end{bmatrix} + D$$

wherein the k refers to the number of iterations of numerical analysis in the unsteady state of fluid and the k+T refer to the number of iterations of numerical analysis in the steady state of fluid, wherein the V(k) refers to an input signal of the $k^{th}$ numerical analysis, wherein the Y(k) refers to an output signal of the $k^{th}$ numerical analysis, and wherein the $\hat{V}(k+T)$ refers to an estimated steady state input signal of the $(k+T)^{th}$ numerical analysis, the estimated steady state input signal $\hat{V}(k+T)$ contributing to the output signal according to the $(k+T)^{th}$ numerical analysis being derived from the training data including the input signal V(k) and the output signal Y(k) used for the $k^{th}$ numerical analysis, wherein the H refers to a degree of influence of each cell with respect to the $\hat{V}(k+T)$, wherein the Q refers to a weight of the $$\begin{bmatrix} V(k) \\ Y(k) \end{bmatrix} \text{on the } \hat{V}(k+T),$$

wherein the D refers to a cancellation constant.

12. The flow analysis method of claim 10,
wherein the generating the analytic model comprises generating the analytic model through an Equation $$\hat{Y}(k+T) = AP\begin{bmatrix} Y(k) \\ \hat{V}(k+T) \end{bmatrix} + C$$

wherein the k refers to the number of iterations of numerical analysis in the unsteady state of fluid and the k+T refer to the number of iterations of numerical analysis in the steady state of fluid, wherein the Y(k) refers to an output signal of the $k^{th}$ numerical analysis, wherein the $\hat{V}(k+T)$ refers to an estimated steady state input signal of the $(k+T)^{th}$ numerical analysis, and wherein the $\hat{Y}(k+T)$ refers to an estimated steady state output signal of the $(k+T)^{th}$ numerical analysis, the estimated output signal $\hat{Y}(k+T)$ according to the $(k+T)^{th}$ numerical analysis being derived from the output signal Y(k) used for the $k^{th}$ numerical analysis and the estimated input signal $\hat{V}(k+T)$ of the $(k+T)^{th}$ numerical analysis derived by the first artificial neural network model, wherein the A refers to a degree of influence of each cell with respect to the $\hat{V}(k+T)$, wherein the P refers to a weight of the $$\begin{bmatrix} V(k) \\ Y(k) \end{bmatrix} \text{on the } \hat{V}(k+T),$$

wherein the C refers to a cancellation constant.

* * * * *